United States Patent
Dubs et al.

(10) Patent No.: US 8,312,152 B2
(45) Date of Patent: Nov. 13, 2012

(54) METHOD, APPARATUS, AND SYSTEM FOR REASSIGNING A NETWORK ADDRESS

(75) Inventors: Justin Tyler Dubs, Durham, NC (US); Steven Richard Perrin, Raleigh, NC (US); James Joseph Thrasher, Efland, NC (US); Michael Terrell Vanover, Raleigh, NC (US); Jennifer Greenwood Zawacki, Hillsborough, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 214 days.

(21) Appl. No.: 12/325,749

(22) Filed: Dec. 1, 2008

(65) Prior Publication Data
US 2010/0138546 A1    Jun. 3, 2010

(51) Int. Cl.
*G06F 15/16* (2006.01)
(52) U.S. Cl. .......... 709/228; 709/229
(58) Field of Classification Search ......... 709/229, 709/228
See application file for complete search history.

(56) References Cited

U.S. PATENT DOCUMENTS

| | | | |
|---|---|---|---|
| 6,826,611 B1 * | 11/2004 | Arndt | 709/226 |
| 2003/0167405 A1 * | 9/2003 | Freund et al. | 713/201 |
| 2006/0235997 A1 * | 10/2006 | Munirajan et al. | 709/245 |
| 2007/0260783 A1 * | 11/2007 | Combs et al. | 710/62 |
| 2008/0062862 A1 * | 3/2008 | Goyal et al. | 370/218 |
| 2009/0198800 A1 * | 8/2009 | Dighe et al. | 709/221 |

OTHER PUBLICATIONS

Nz (Define communication device, Author: Nz, http://sawaal.ibibo.com/computers-and-technology/define-communications-device-273962.html, Jan. 24, 2008).*

* cited by examiner

*Primary Examiner* — George C Neurauter
*Assistant Examiner* — Joel Mesa
(74) *Attorney, Agent, or Firm* — Kunzler Law Group, PC (57) ABSTRACT

A method, apparatus, and system are disclosed for reassigning a network address. A detection module detects a routing table change for a host. The host is in communication with a least one network. A client is also in communication with the host over a network interface using a first address. A generation module generates a second address for the client. The second address does not compete with other addresses on the at least one network. An interface module disables the network interface to the client. The interface module then enables the network interface between the client and the host. A communication module receives a request for a new address from the client. The communication module assigns the second address to the client.

16 Claims, 6 Drawing Sheets

METHOD, APPARATUS, AND SYSTEM FOR REASSIGNING A NETWORK ADDRESS

BACKGROUND OF THE INVENTION

1. Field of the Invention

This invention relates to network addresses and more particularly relates to reassigning a network address.

2. Description of Related Art

Universal Serial Bus (USB) devices often connect to hosts. For example, a smart phone may connect to a computer workstation. A USB device may appear to a host as a network adapter. As a network adapter, the USB device has an Internet Protocol (IP) address on a specified subnet. Unfortunately, if the USB device attaches to a new network that also uses the USB device's address, there is an IP address conflict and the host cannot communicate with the USB device.

SUMMARY OF THE INVENTION

From the foregoing discussion, there is a need for a method, apparatus, and system that reassigns network addresses. Beneficially, such a method, apparatus, and system would reassign a network address to avoid network address conflict. Network addresses are referred to herein as addresses.

The present invention has been developed in response to the present state of the art, and in particular, in response to the problems and needs in the art that have not yet been fully solved by currently available address reassignment methods. Accordingly, the present invention has been developed to provide a method, apparatus, and system for reassigning an address that overcome many or all of the above-discussed shortcomings in the art.

A method of the present invention is presented for reassigning an address. In one embodiment, the method includes detecting a routing table change, generating a second address, disabling a network interface, enabling the network interface, receiving a request for a new address, and assigning the second address.

A detection module detects a routing table change for a host. The host is in communication with a least one network. A client is also in communication with the host over a network interface using a first address.

A generation module generates a second address for the client. The second address does not compete with other addresses on the at least one network. An interface module disables the network interface to the client.

The interface module then enables the network interface between the client and the host. A communication module receives a request for a new address from the client. The communication module assigns the second address to the client.

The apparatus to reassign an address is provided with a plurality of modules configured to functionally execute the steps of the method. The modules include a detection module, a generation module, an interface module, and a communication module.

The detection module detects a routing table change for a host. The host is in communication with a least one network. A client is also in communication with the host over a network interface using a first address.

The generation module generates a second address for the client. The second address does not compete with other addresses on the at least one network. The interface module disables the network interface to the client.

The interface module then enables the network interface between the client and the host. A communication module receives a request for a new address from the client. The communication module assigns the second address to the client.

A system of the present invention is also presented to reassign an address. The system may be embodied in computer coupled to a USB device. In particular, the system, in one embodiment, includes a client, at least one network, and a host. The host includes a detection module, a generation module, and interface module, and a communication module.

The client communicates with the host through a network interface using a first address. The at least one network is in communication with the host.

The detection module detects a routing table change for a host. The generation module generates a second address for the client. The second address does not compete with other addresses on the at least one network. The second address is generated from a list of possible networks. Unsuitable networks are removed from the list of possible networks are by comparing each network in the list of possible networks with each entry in the routing table and removing a first network from the list of possible networks if the net mask for a first entry in the routing table is not equal to '0.0.0.0' and if a logical AND of an address of the at least one network and the first entry net mask is equal to the first entry.

The interface module disables the network interface to the client. The interface module then enables the network interface between the client and the host. The communication module receives a request for a new address from the client. The communication module assigns the second address to the client.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention reassigns an address to a client to prevent address conflicts. In addition, the present invention executes a subnet hop when the client's address may conflict with other addresses. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform logic functions, execute computer readable programs stored on tangible storage devices, and/or execute programmed functions. Modules may also include a computer readable storage medium comprising a computer readable program stored on a tangible storage device that performs a function when executed by a hardware circuits such as a processor, microcontroller, or the like.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
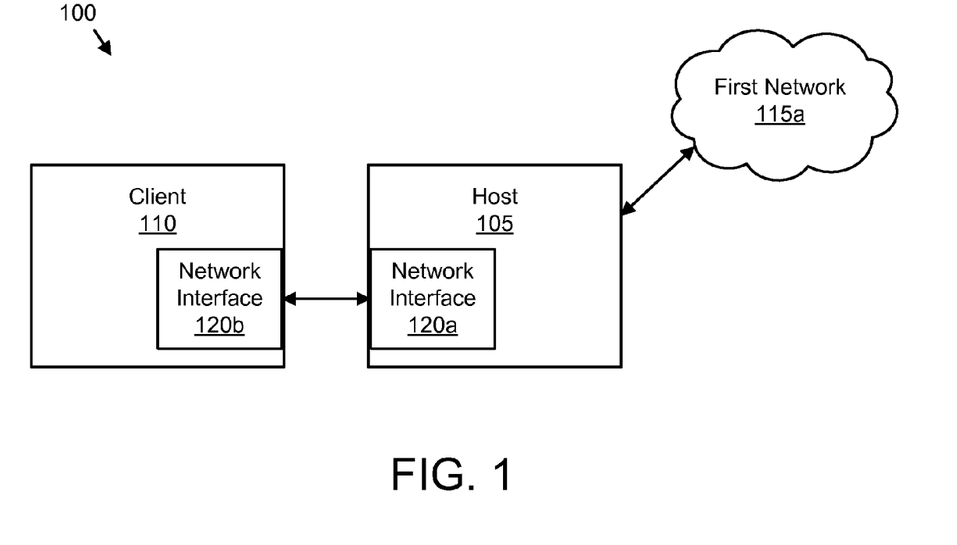
FIG. 1 is a schematic block diagram illustrating one embodiment of a host and client in accordance with the present invention.

FIG. 1 is a schematic block diagram 100 illustrating one embodiment of a host 105 and client 110 in accordance with the present invention. The host 105 may be a computer workstation, a notebook personal computer, or the like. Alternatively, the host 105 may be a server, a router, and/or a bridge. The client 110 may be a smart phone, a Personal Digital Assistant (PDA), an entertainment device, or the like.

The host 105 and the client 110 communicate through the network interfaces 120. In one embodiment, the network interfaces 120 are Universal Serial Bus (USB) interfaces. In a certain embodiment, the network interfaces 120 comprise USB Remote Network Driver Interface Specification (RNDIS) interfaces. The network interfaces 120 may also comprise USB Communications Device Class (CDC) interfaces. In one embodiment, the network interfaces 120 comprise USB Wireless Mobile Communications Device Class (WM-CDC) interfaces.

The network interfaces 120 may also comply with Institute of Electrical and Electronic Engineers (IEEE) 802.11 specification. Alternatively the network interfaces 120 may be mobile telephone networks. In addition, the network interfaces 120 may conform to the Bluetooth specification.

The host 105 is shown in communication with a first network 115a. One of skill in the art will recognize that the host 105 may be in communication with a plurality of networks. The first network 115a may be an Ethernet network, an Internet connection, a Local Area Network (LAN), a Wide Area Network (WAN), a token ring network, or the like. The host 105 may maintain a routing table.

The host 105 and the first network 115a each have an address. The client 110 is also assigned a first address. The routing table may list the addresses for the first network 115a, the host 105, and the client 110. The addresses may be Internet Protocol (IP) address as is well known to those of skill in the art. The IP addresses may each also include a subnet address.

When the host 105 communicates with the client 110, the host 105 addresses the client 110 using the first address. The first address must be unique or communications from the host 105 to the client 110 may be misdirected. For example, if the client 110 has a first address that is equivalent to the address of another device in communication with the first network 115a, communications intended for the client 110 may be routed to the other device. Similarly communications intended for the other device may be routed to the client 110.

Figure 2:
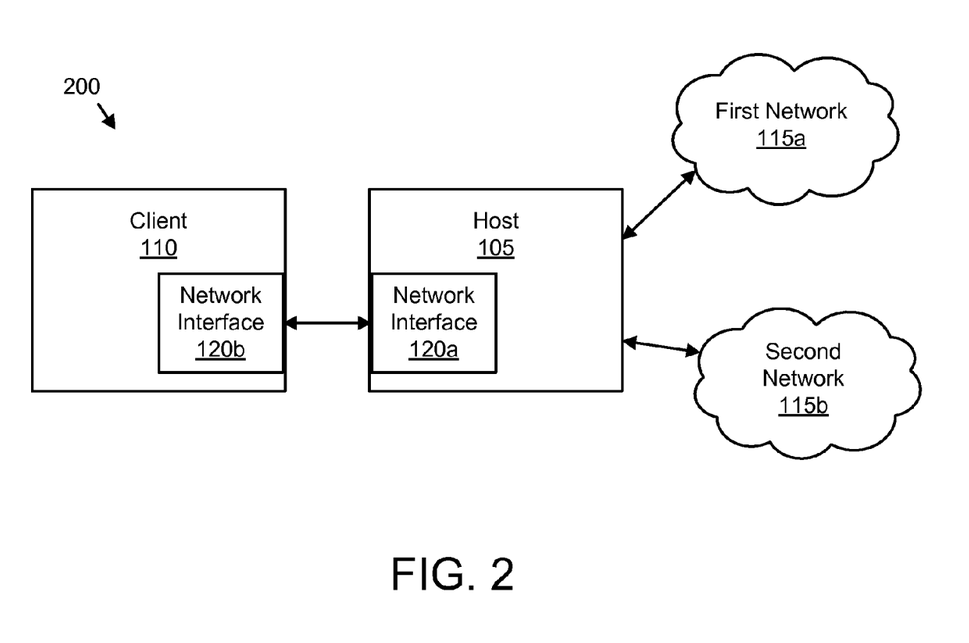
FIG. 2 is a schematic block diagram illustrating one alternate embodiment of the host and client of the present invention.

FIG. 2 is a schematic block diagram 200 illustrating one alternate embodiment of the host 105 and client 110 of the present invention. The host 105 and the client 110 are the host 105 and client 110 of FIG. 1. The description of the hosts 105 in the client 110 refers to elements of FIG. 1, like numbers referring to like elements.

A second network 115b is shown in communication with the host 105. For example, the host 105 may connect to the second network 115b after the client 110 is assigned the first address. Unfortunately, the first address may conflict with an address of a device in communication with a second network 115b. The present invention reassigns an address to the client 110 as will be described hereafter.

Figure 3:
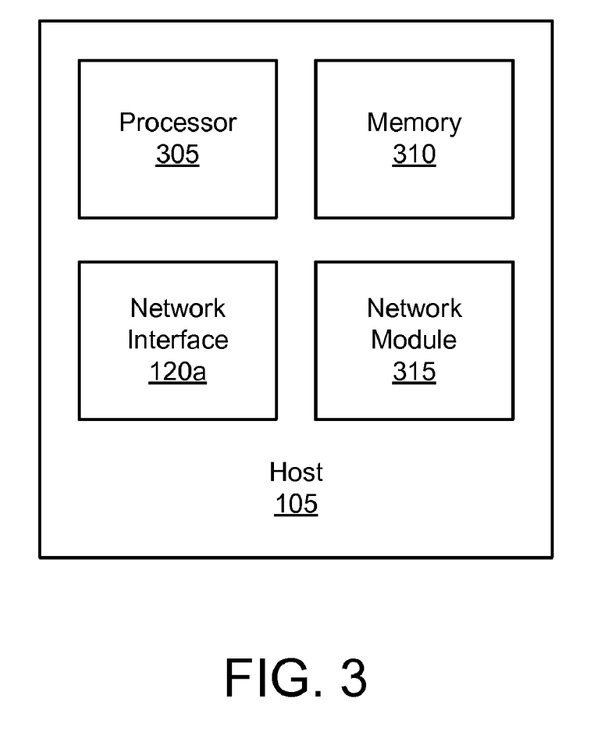
FIG. 3 is a schematic block diagram illustrating one embodiment of the host of the present invention.

FIG. 3 is a schematic block diagram illustrating one embodiment of the host 105 of the present invention. The host 105 is the host 105 of FIGS. 1-2. The description of the host 105 refers to elements of FIGS. 1-2, like numbers referring to like elements. The host 105 includes a processor 305, a memory 310, a network interface 120a, and a network module 315. Although, for simplicity, one processor 305, one memory 310, one network interface 120a, and one network module 315 are shown, any number of processors 305, memories 310, network interfaces 120a, and network modules 315 may be employed.

The memory 310 may store one or more computer readable programs. Each computer readable program may include executable code and data. The memory 310 may be a semiconductor device such as a Dynamic Random Access Memory (DRAM). Alternatively, the memory 310 may be a flash memory, a micromechanical memory, an optical memory, a holographic memory, a hard disk drive, or the like. One of skill in the art will recognize that the memory 310 may be any type of tangible storage device.

The processor 305 may retrieve one or more computer readable programs from the memory 310. In addition, the processor 305 may process the computer readable programs as is well known to those of skill in the art. In one embodiment, the processor 305 may execute a computer readable program that functions as a Dynamic Host Configuration Protocol (DHCP) server.

The network module 315 may communicate with one or more networks 115. The network module 315 may be a Network Interface Card (NIC), wireless transceiver, or the like. The network interface 120a may include USB, USB RNDIS, USB WMCDC, and USB CDC network interfaces.

Figure 4:
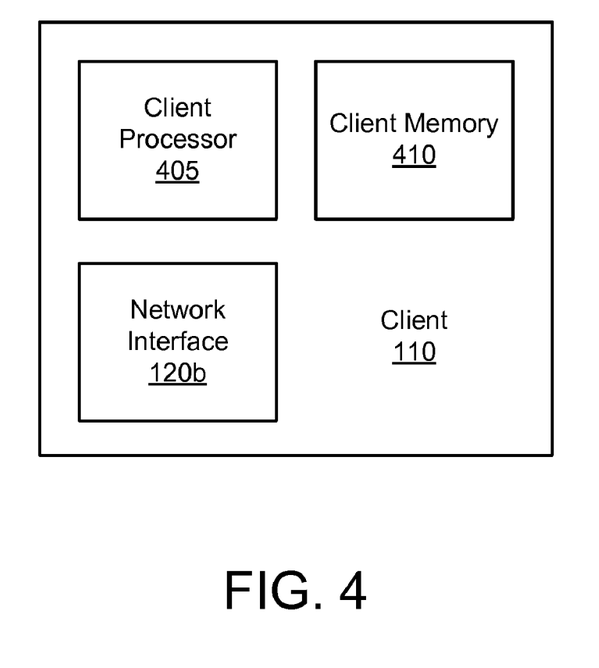
FIG. 4 is a schematic block diagram illustrating one embodiment of the client of the present invention.

FIG. 4 is a schematic block diagram illustrating one embodiment of the client 110 of the present invention. The client 110 is the client 110 of FIGS. 1-2. The description of the client 110 refers to elements of FIGS. 1-3, like numbers referring to like elements. The client 110 includes client processor 405, a client memory 410, and a network interface 120b.

The client memory 410 may store one or more computer readable programs. The client memory 410 may be DRAM, flash memory, micromechanical memory, and optical memory, holographic memory, a hard disk drive, or the like. One of skill in the art will recognize that the client memory 410 may be any type of tangible storage device.

The client processor 405 may execute one or more computer readable programs from the client memory 410. In one embodiment, the client processor 405 executes a computer readable program that functions as DHCP client.

The client processor 405 may also manage the network interface 120b. The network interface 120b may include USB, USB RNDIS, USB WMCDC, and USB CDC network interfaces.

Figure 5:
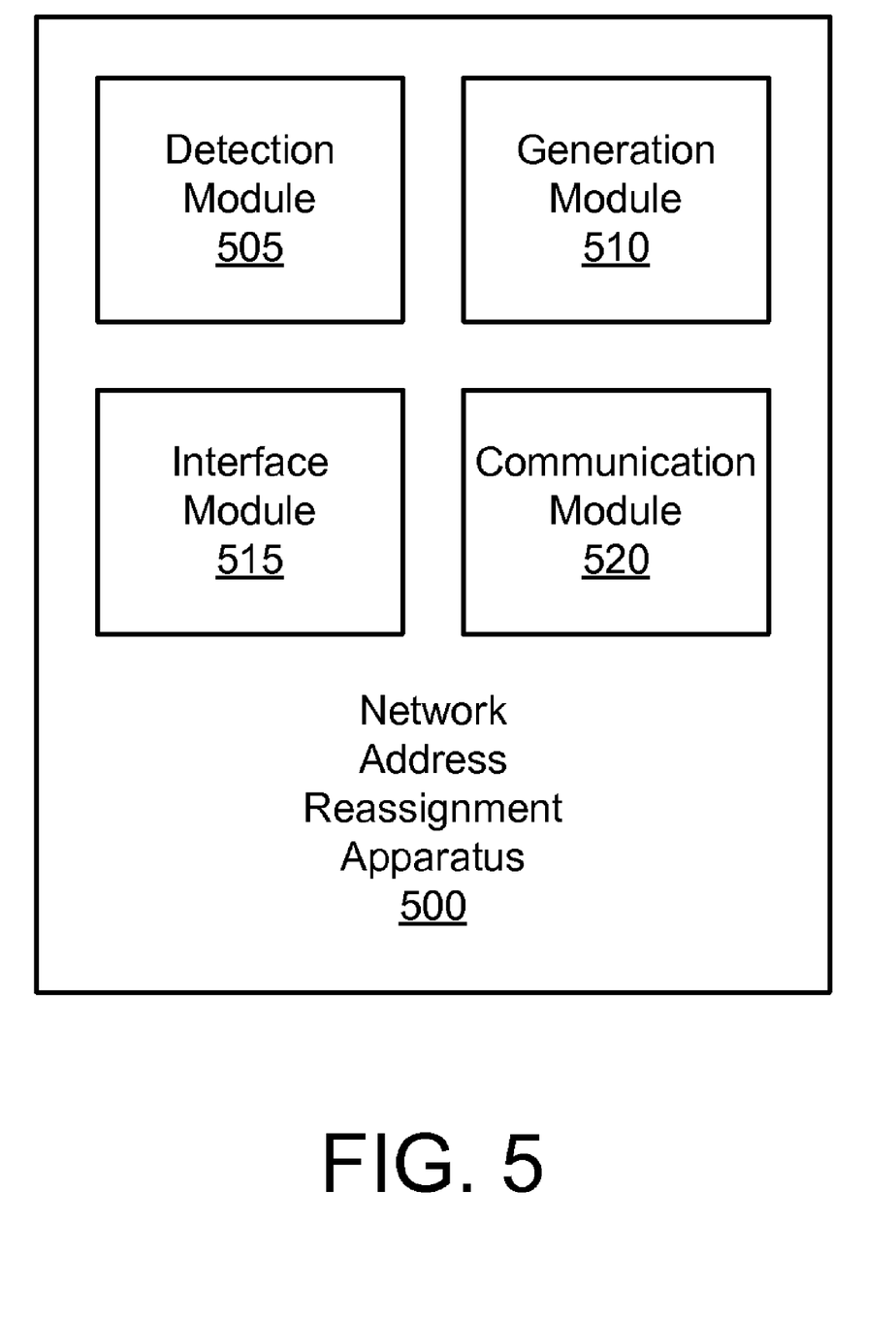
FIG. 5 is a schematic block diagram illustrating one embodiment of a network address reassignment apparatus of the present invention.

FIG. 5 is a schematic block diagram illustrating one embodiment of a network address reassignment apparatus 500 of the present invention. The apparatus 500 may be embodied in the host 105 of FIGS. 1-3. The description of the apparatus 500 refers to elements of FIGS. 1-4, like numbers referring to like elements. The apparatus 500 includes a detection module 505, a generation module 510, an interface module 515, and a communication module 520.

The detection module 505, generation module 510, interface module 515, and communication module 520 may be embodied in a computer readable storage medium. The computer readable storage medium may comprise one or more computer readable programs stored on a tangible storage device such as a memory 310. The computer readable programs may be executed by a processor such as the processor 305. The computer readable programs when executed by the processor 305 or on a computer such as the host 105 may perform the functions of the detection module 505, the generation module 510, the interface module 515, and the communication module 520.

The detection module 505 detects a routing table change for a host 105. In one embodiment, the routing table is changed when the host 105 connects to a new network 115. For example, if the host 105 is originally connected to the first network 115a and then connects to the second network, 115b, the routing table may be changed to include an address of the second network 115b or of devices in communication with the second network 115b. Alternatively, an address reassignment for a network 115 may cause the routing table change. For example, if the address of the first network 115a changes, the change will be recorded in the routing table.

The generation module generates 510 a second address for the client as will be described hereafter. The second address does not compete with other addresses on the at least one network 115.

The interface module 515 disables the network interface 120 to the client. In one embodiment, the interface module 515 disables the host network interface 120a. For example, the interface module 515 may suspend operations of the host network interface 120a. Alternatively, the interface module 515 may disable the client network interface 120b.

The interface module 515 also enables the network interface 120 between the client 110 and the host 105. For example, interface module 515 may enable the host network interface 120a. The communication module 520 receives a request for a new address from the client 110. The communication module 520 further assigns the second address to the client 110 in response to the request.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6A:
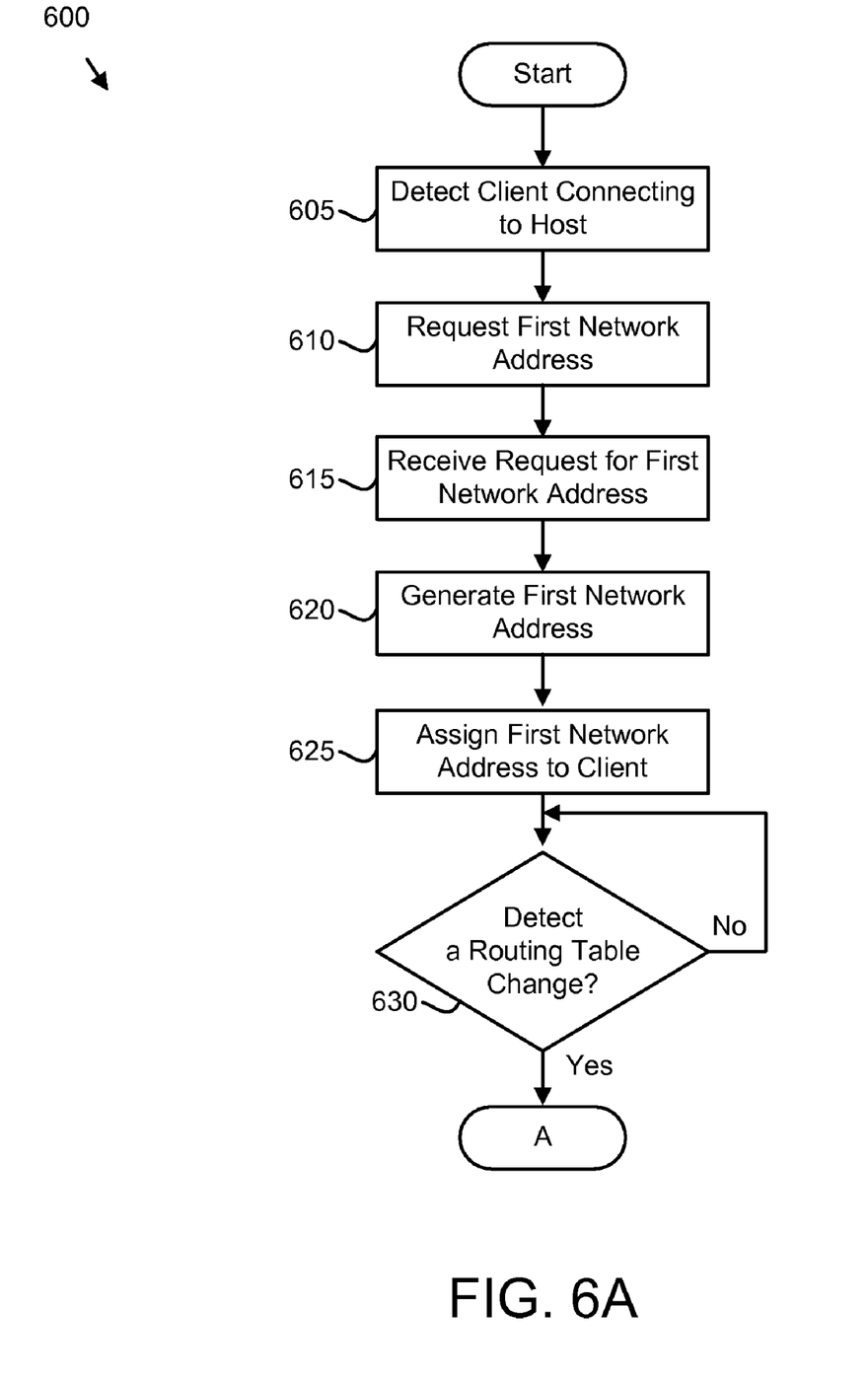
FIGS. 6A and 6B are a schematic flow chart diagram illustrating one embodiment of an address reassignment method of the present invention.
Figure 6B:
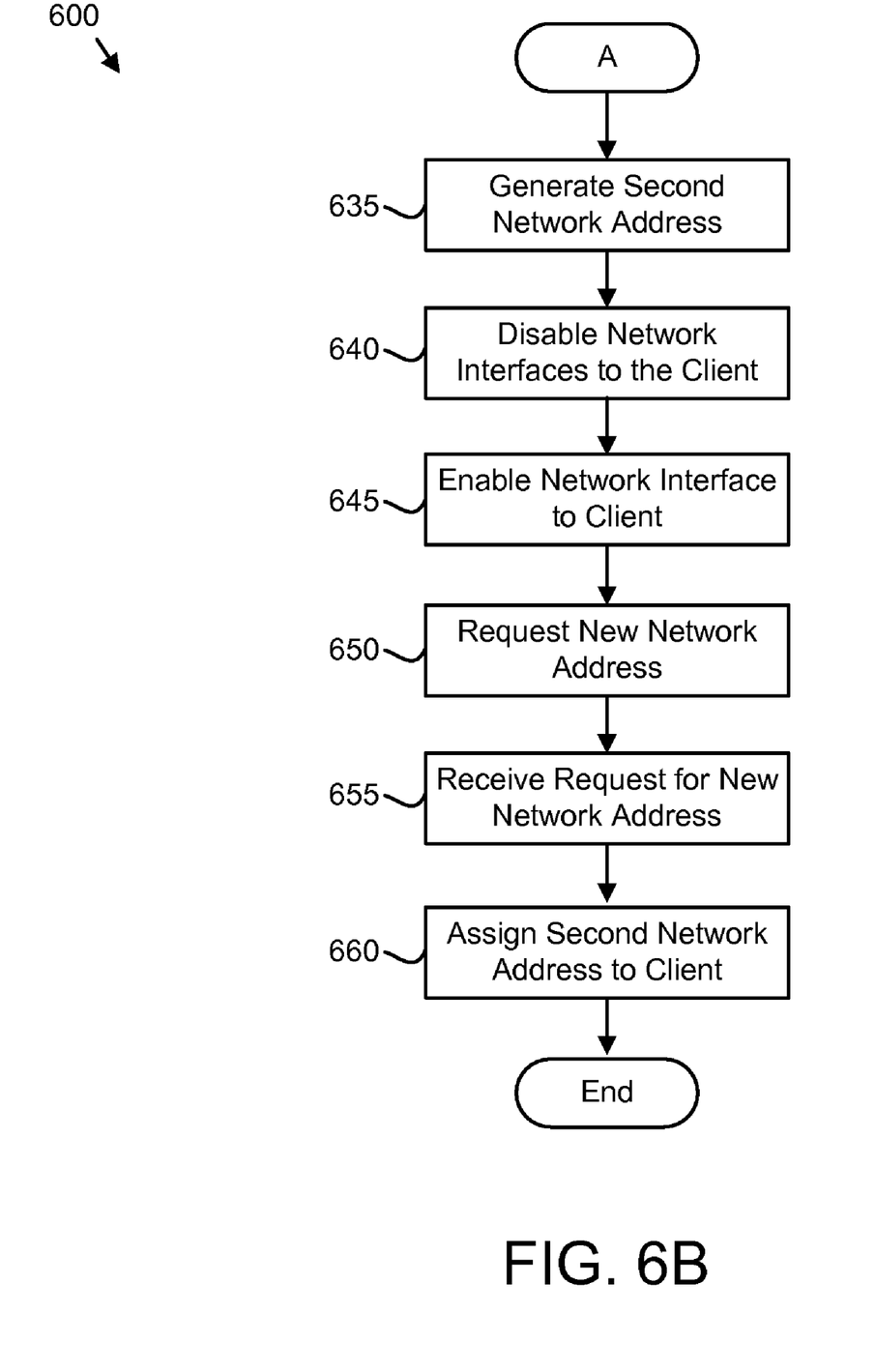

FIGS. 6A and 6B are a schematic flow chart diagram illustrating one embodiment of a network reassignment method 600 of the present invention. The method 600 substantially includes the steps to carry out the functions presented above with respect to the operation of the described apparatus and system of FIGS. 1-5. In one embodiment, the method 600 is implemented with a computer readable storage medium comprising a computer readable program stored on a tangible storage device. The computer readable storage medium may be integrated into a computing system, such as the host 105, wherein the computer readable program executed by the computing system performs the method 600.

In FIG. 6A the method 600 begins, and the detection module 505 may detect 605 a client 110 connecting to the first network 115a. To illustrate the method 600, the first network 115a and second network 115b are referred to. However one of skill in art will recognize that the method 600 may be practiced with any number of networks 115. The interface module 515 may establish communications with the client 110.

In one embodiment, the client 110 requests 610 a first address from the host 105 in response to connecting to the host 105. The communication module 520 may receive 615 the request for the first address. The generation module 510 may generate 620 the first address.

In one embodiment, the generation module 510 employs a routing table to generate addresses. Table 1 is a prophetic example of the routing table. In one embodiment, the routing table uses Internet Protocol version 4 (IPv4) addresses as shown in Table 1. In an alternate embodiment, the routing table uses Internet Protocol version 6 (IPv6) addresses. In a certain embodiment, the routing table uses both IPv4 and IPv6 addresses.

TABLE 1

Routing Table

| Network Destination | Netmask | Gateway | Network Address | Metric |
|---|---|---|---|---|
| 0.0.0.0 | 0.0.0.0 | 10.37.138.254 | 10.37.138.191 | 25 |
| 10.37.138.0 | 255.255.255.0 | On-link | 10.37.138.191 | 281 |
| 10.37.138.191 | 255.255.255.255 | On-link | 10.37.138.191 | 281 |
| 10.37.138.255 | 255.255.255.255 | On-link | 10.37.138.191 | 281 |
| 127.0.0.0 | 255.0.0.0 | On-link | 127.0.0.1 | 306 |
| 127.0.0.1 | 255.255.255.255 | On-link | 127.0.0.1 | 306 |
| 127.255.255.255 | 255.255.255.255 | On-link | 127.0.0.1 | 306 |
| 169.254.0.0 | 255.255.0.0 | On-link | 169.254.143.5 | 30 |
| 169.254.143.5 | 255.255.255.255 | On-link | 169.254.143.5 | 286 |
| 169.254.255.255 | 255.255.255.255 | On-link | 169.254.143.5 | 286 |
| 224.0.0.0 | 240.0.0.0 | On-link | 127.0.0.1 | 306 |
| 224.0.0.0 | 240.0.0.0 | On-link | 10.37.138.191 | 281 |
| 224.0.0.0 | 240.0.0.0 | On-link | 169.254.143.5 | 286 |
| 255.255.255.255 | 255.255.255.255 | On-link | 127.0.0.1 | 306 |
| 255.255.255.255 | 255.255.255.255 | On-link | 10.37.138.191 | 281 |
| 255.255.255.255 | 255.255.255.255 | On-link | 169.254.143.5 | 286 |

In one embodiment, the generation module 510 compares entries in the routing table to a list of possible networks. For example, the list of possible networks may include the networks 192.168.n.0 for n=0 to 254. In a certain embodiment, the generation module 510 compares each entry in the routing table to each network in the list of possible networks. The generation module 510 may remove a first network from the list of possible networks if the net mask for a first entry in the routing table is not equal to '0.0.0.0' and if a logical AND of the first network and the first entry net mask is equal to the first entry network. In a certain embodiment, the generation module 510 selects an address from the suitable networks in the list of possible networks. For example, the generation module 510 may select an initial network address of the suitable networks in the list of possible networks. Table 2 illustrates the algorithm described above for generating the address.

TABLE 2

```
foreach entry in routingTable
   foreach network in possibleNetworks
      if (entry.Netmask != 0.0.0.0) && ((network & entry.Netmask) ==
entry.NetworkDestination)
         possibleNetworks.Remove(network)
selectedNetwork = possibleNetworks.GetFirstMember(Network Address)
```

In one embodiment, a communication module 520 assigns 625 the first address to the client 110. The communication module 520 may communicate the first address along with an indicator identifying the first address to the client 110.

The detection module 505 detects 630 a routing table change for the host 105. It embodiment, the routing table is changed when the host 105 connects to a new network 115. For example, if the host 105 is originally connected to the first network 115a and then connects to the second network, 115b, the routing table may be changed to include an address of the second network 115b. Alternatively, an address reassignment for a network 115 may cause the routing table change. For example, if the address of the first network 115a changes, the change will be recorded in the routing table.

Turning to FIG. 6B, the generation module 510 generates 635 a second address for the client. In one embodiment, the generation module 510 employs the routing table of Table 1 and the list of possible networks described above to generate 635 the second address. In addition, the generation module 510 may employ the algorithm of Table 2 to generate 635 the second address. The second address does not compete with other addresses on the at least one network 115.

The interface module 515 disables 640 the network interface 120 to the client 110. The interface module 515 then enables 645 the network interface 120 between the client 110 and the host 105.

As a result of the interface module 515 enabling the network interface 120, the client 110 requests 650 a new address. For example, the client 110 may be configured to request 650 an address whenever the client 110 establishes a new connection to the host 105. The client 110 may be configured as a DHCP client to request 650 the second address.

The client 110 may communicate the request over the network interfaces 120 to the host 105. The communication module 520 receives 655 the request for the new address from the client 110. The host 105 may be configured as a DHCP host, and so may receive requests for addresses and respond by assigning addresses.

The communication module further 520 assigns 660 the second address to the client 110 and the method 600 ends. The communication module 520 may communicate the second address along with the indicator identifying the second address over the network interface 120 to the client 110.

By disabling 640 the network interfaces to the client 110 and then enabling 645 the second network interface to the client 110, the method 600 forces the client 110 to request 650 a new address. As a result, the client 110 performs a subnet hop to the second address. The method 600 generates 635 a second address that does not conflict with other addresses on the networks 115. Thus the client 110 may continue to communicate with the host 105.

Figure 7:
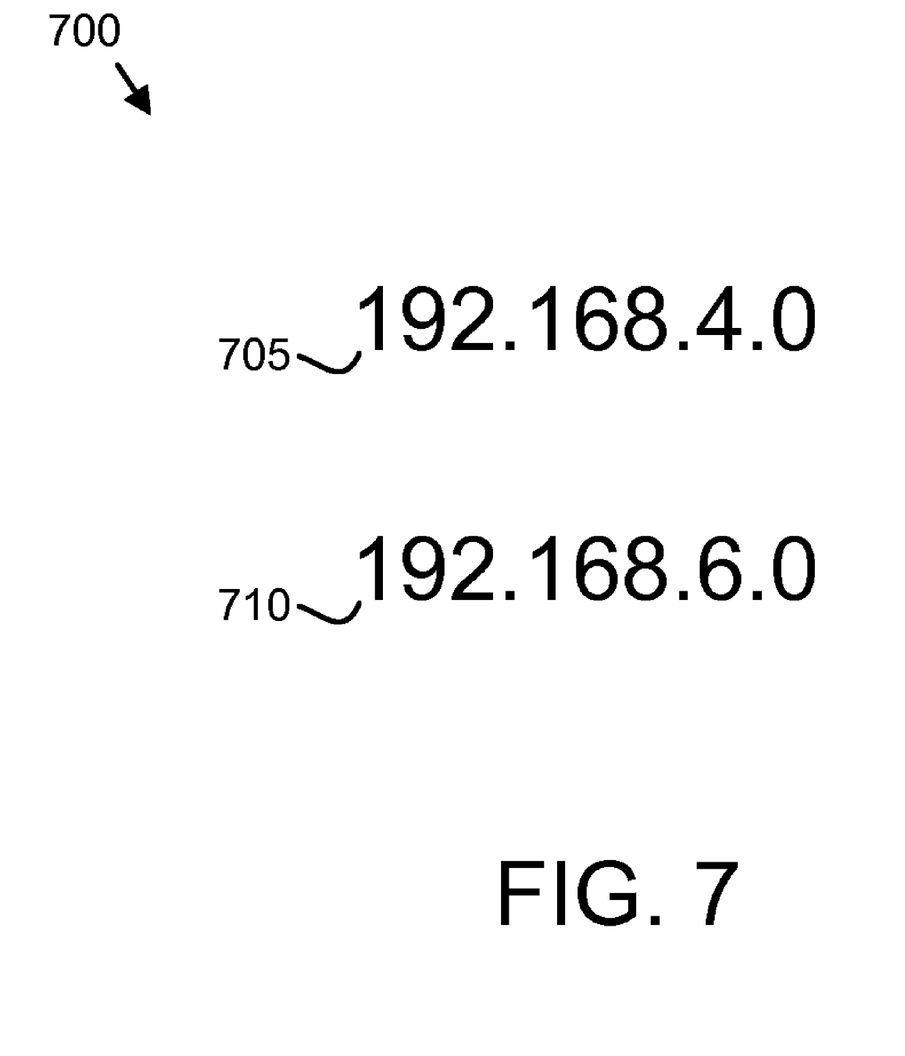
FIG. 7 is a text drawing illustrating one embodiment of addresses of the present invention.

FIG. 7 is a text drawing illustrating one embodiment of addresses 700 of the present invention. The addresses 700 are the first address 705 and the second address 710 generated by the generation module 510 of FIG. 5. The description of the addresses 700 refers to elements of FIGS. 1-5, like numbers referring to like elements.

The first address 705 may be generated 620 by the generation module 510 when the client 110 connects to the host 105 through the first network 115a. The generation module 510 may subsequently generate 635 the second address 710. The second address 710 does not compete with any other addresses including the first address 705 on the networks 115.

The present invention reassigns an address 700 to a client 110 to prevent address conflicts. When the host 105 connects to a new second network 115*b* or otherwise changes the routing table, the present invention detects 630 the change. The present invention then generates 635 the second address 710 that does not conflict with other addresses on the networks 115. The present invention then disables 640 the network interfaces 120 to the client 110, and enables the network interfaces 120 to the client 110, causing the client 110 to request 650 a new address. The present invention may then assign 660 the second address 710 to the client 110.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory computer readable storage medium comprising a computer readable program for reassigning a network address, wherein the computer readable program when executed on a host computer causes the host computer to: detect a routing table change for the host computer, wherein the host computer is in communication with at least one network and a client is in communication with the host computer over a Universal Serial Bus (USB) interface using a first address, the USB interface not connecting to the at least one network, the routing table change resulting from at least one of the host computer connecting to a new network and an address reassignment for the at least one network; generate a second address for the client in response to detecting the routing table change, wherein the second address does not compete with other addresses on the at least one network; disable the USB interface to the client by suspending operations of the USB interface in response to generating the second address; enable the USB interface between the client and the host computer in response to disabling the USB interface; receive a request for a new address from the client, the client generating the request in response to enabling the USB interface; and assign the second address to the client.

2. The non-transitory computer readable storage medium of claim 1, wherein the host computer is a Dynamic Host Configuration Protocol (DHCP) server and the client is a DHCP client.

3. The non-transitory computer readable storage medium of claim 1, wherein the USB interface is a USB Remote Network Driver Interface Specification (RNDIS) interface.

4. The non-transitory computer readable storage medium of claim 1, wherein the USB interface is a USB Wireless Mobile Communications Device Class (WMCDC) interface.

5. The non-transitory computer readable storage medium of claim 1, wherein the USB interface is a USB Communications Device Class (CDC) interface.

6. The non-transitory computer readable storage medium of claim 1, wherein the second address is an Internet Protocol (IP) address.

7. The non-transitory Computer readable storage medium of claim 1, wherein the second address is generated from a list of possible networks, wherein unsuitable networks are removed from the list of possible networks are by comparing each network in the list of possible networks with each entry in the routing table and removing a first network from the list of possible networks if the net mask for a first entry in the routing table is not equal to '0.0.0.0' and if a logical AND of an address of the at least one network and the first entry net mask is equal to the first entry.

8. The non-transitory computer readable storage medium of claim 7, wherein the second address is an initial network address in the list of possible networks.

9. The non-transitory Computer readable storage medium of claim 5, wherein the list of possible networks comprises the networks 192.168.n.0 for n=0 to 254.

10. The non-transitory computer readable storage medium of claim 1, wherein the computer readable program is further configured to cause the host computer to: detect the client connecting to the host computer; receive a request for the first address from the client; generate the first network address for the client; and assign the first network address to client.

11. An apparatus comprising: a non-transitory computer readable storage medium storing a computer readable program; a processor executing the computer readable program, the computer readable program comprising: a detection module detecting a routing table change for a host, wherein the host is in communication with at least one network and a client is in communication with the host over a Universal Serial Bus (USB) interface using a first address, the USB interface not connecting to the at least one network, the routing table change resulting from at least one of the host computer connecting to a new network and an address reassignment for the at least one network; a generation module generating a second address for the client in response to; detecting the routing table change, wherein the second address does not compete with other addresses on the at least one network; an interface module disabling the USB interface to the client by suspending operations of the USB interface in response to generating the second address and enabling the USB interface between the client and the host in response to disabling the USB interface; and a communication module receiving a request for a new address from the client, the client generating the request in response to enabling the USB interface, and assigning the second address to the client.

12. The apparatus of claim 11, wherein the host is a Dynamic Host Configuration Protocol (DHCP) server and the client is a DHCP client.

13. The apparatus of claim 11, wherein the generation module generates the second address from a list of possible networks, wherein unsuitable networks are removed from the list of possible networks are by comparing each network in the list of possible networks with each entry in the routing table and removing a first network from the list of possible networks if the net mask for a first entry in the routing table is not equal to '0.0.0.0' and if a logical AND of an address of the at least one network and the first entry net mask is equal to the first entry.

14. A system comprising: a client being in communication with a host through a Universal Serial Bus (USB) interface using a first address; at least one network being in communication with the host, the USB interface not connecting to the at least one network; the host comprising a non-transitory computer readable storage medium storing a computer readable program and a processor executing the computer readable program, the computer readable program comprising: a detection module detecting a routing table change for the host, the routing table change resulting from at least one of the host computer connecting to a new network and an address reassignment for the at least one network; a generation module generating a second address for the client in response to detecting the routing table change, wherein the second address does not compete with other addresses on the at least one network; an interface module disabling the USB interface to the client by suspending operations of the USB interface in response to generating the second address and enabling the USB interface between the client and the host in response to disabling the USB interface; and a communication module receiving a request for a new address from the client, the client generating the request in response to enabling the USB interface, and assigning the second address to the client.

15. The system of claim 14, wherein the host is a Dynamic Host Configuration Protocol (DHCP) server and the client is a DHCP client.

16. The system of claim 14, wherein the generation module generates the second address from a list of possible networks, wherein unsuitable networks are removed from the list of possible networks are by comparing each network in the list of possible networks with each entry in the routing table and removing a first network from the list of possible networks if the net mask for a first entry in the routing table is not equal to '0.0.0.0' and if a logical AND of an address of the at least one network and the first entry net mask is equal to the first entry.

* * * * *